(12) United States Patent
Remy et al.

(10) Patent No.: US 8,720,624 B2
(45) Date of Patent: May 13, 2014

(54) ANGLED ACTIVE SHUTTER WITH DUAL-DRIVE ACTUATION

(75) Inventors: John C. Remy, Shelby Township, MI (US); Scott P. Charnesky, Birmingham, MI (US); Tricia Price, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 94 days.

(21) Appl. No.: 13/442,914

(22) Filed: Apr. 10, 2012

(65) Prior Publication Data

US 2013/0264133 A1  Oct. 10, 2013

(51) Int. Cl.
*B60K 11/00* (2006.01)
(52) U.S. Cl.
USPC ......................................................... 180/68.1
(58) Field of Classification Search
USPC ......................................................... 180/68.1
See application file for complete search history.

(56) References Cited

U.S. PATENT DOCUMENTS

| 1,950,792 | A | * | 3/1934 | Green .............................. 165/98 |
| 4,723,464 | A | * | 2/1988 | Welschof et al. ............. 475/222 |
| 5,613,914 | A | * | 3/1997 | Gleasman et al. ............ 464/159 |
| 5,917,405 | A | * | 6/1999 | Joao ......................... 340/426.17 |
| 6,012,297 | A | * | 1/2000 | Ichishi et al. ..................... 62/179 |
| 6,281,649 | B1 | * | 8/2001 | Ouellette et al. .............. 318/443 |
| 7,442,126 | B2 | * | 10/2008 | Thompson .................... 464/112 |
| 2010/0243352 | A1 | * | 9/2010 | Watanabe et al. ............ 180/68.1 |
| 2011/0288717 | A1 | * | 11/2011 | Yu et al. .......................... 701/29 |

* cited by examiner

*Primary Examiner* — Behrang Badii
*Assistant Examiner* — Daniel L Greene
(74) *Attorney, Agent, or Firm* — Quinn Law Group, PLLC

(57) ABSTRACT

A shutter system includes a first louver configured to rotate about a first pivot axis and a second louver configured to rotate about a second pivot axis. The second pivot axis is arranged at an angle that is smaller than 180 degrees with respect to the first pivot axis. The shutter system also includes a dual-drive actuation mechanism configured to rotate the first and the second louvers about the respective pivot axes. The dual-drive mechanism includes a first driven element operatively connected to the first louver and a second driven element operatively connected to the second louver. The dual-drive mechanism also includes a drive element configured to receive a drive torque and apply the drive torque simultaneously to the first and second driven elements. A vehicle having the above shutter system is also disclosed.

18 Claims, 5 Drawing Sheets

ANGLED ACTIVE SHUTTER WITH DUAL-DRIVE ACTUATION

TECHNICAL FIELD

The disclosure relates to an angled active shutter with dual-drive actuation.

BACKGROUND

A shutter is typically a solid and stable covering for an opening. A shutter frequently consists of a frame and louvers or slats mounted within the frame.

Louvers may be fixed, i.e., having a permanently set angle with respect to the frame. Louvers may also be operable, i.e., having an angle that is adjustable with respect to the frame for permitting a desired amount of light, air, and/or liquid to pass from one side of the shutter to the other. Depending on the application and the construction of the frame, shutters can be mounted to fit within, or to overlap the opening. In addition to various functional purposes, particularly in architecture, shutters may also be employed for largely ornamental reasons.

In motor vehicles, a shutter may be employed to control and direct a stream of air to various vehicle compartments and/or subsystems. Particularly, a shutter may be positioned at the front of the vehicle and employed to cool a vehicle's powertrain, as well as enhance comfort of vehicle passengers.

SUMMARY

A shutter system includes a first louver configured to rotate about a first pivot axis and a second louver configured to rotate about a second pivot axis. The second pivot axis is arranged at an angle that is smaller than 180 degrees with respect to the first pivot axis. The shutter system also includes a dual-drive actuation mechanism configured to rotate the first and the second louvers about the respective pivot axes. The dual-drive mechanism includes a first driven element operatively connected to the first louver and a second driven element operatively connected to the second louver. The dual-drive mechanism also includes a drive element configured to receive a drive torque and apply the drive torque simultaneously to the first and second driven elements.

The rate of rotation of the first louver and the rate of rotation of the second louver may be substantially synchronized by the dual-drive actuation mechanism.

The first driven element may include a first gear and the second driven element may include a second gear. Additionally, the drive element may include a first toothed portion engaged with the first gear and a second toothed portion engaged with the second gear.

The drive element may be operatively connected to at least one of the first driven element and the second driven element via one of a constant velocity joint and a universal joint.

The first driven element, the second driven element, and the drive element may be substantially screened from ambient airflow and protected from airborne dirt and debris by a shield.

The dual-drive actuation mechanism may additionally include an electric motor configured to supply the drive torque to the drive element.

The shutter system may additionally include a controller configured to regulate the dual-drive actuation mechanism and select a position for the shutter system between and inclusive of fully-opened and fully-closed.

The shutter system may be configured to control airflow through a grille opening in a vehicle having an internal combustion engine. In such a case, the controller may also be configured to regulate the dual-drive actuation mechanism according to a load on the engine.

The vehicle engine may be cooled by a fluid circulated through a heat exchanger. In such a case, the vehicle may also include a sensor adapted to sense a temperature of the fluid and configured to communicate the temperature to the controller.

The controller may be configured to regulate the dual-drive actuation mechanism to cool the fluid circulated through the heat exchanger according to the sensed temperature of the fluid.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
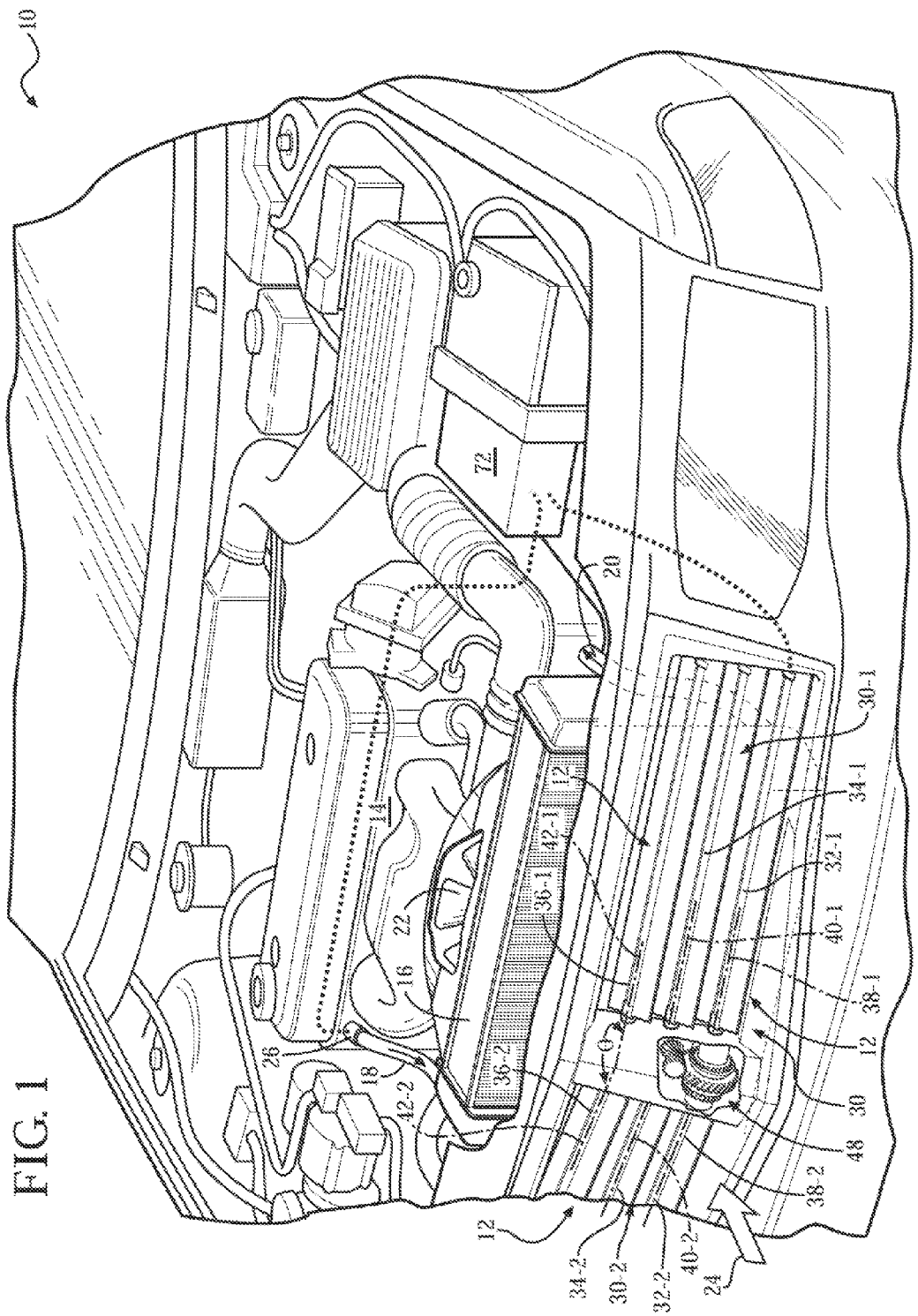
FIG. 1 is a partial perspective view of a vehicle having a shutter system with rotatable louver sets arranged at an angle and a drive actuation mechanism for rotating the louver sets, with the louvers being depicted in a fully-closed state.
Figure 2:
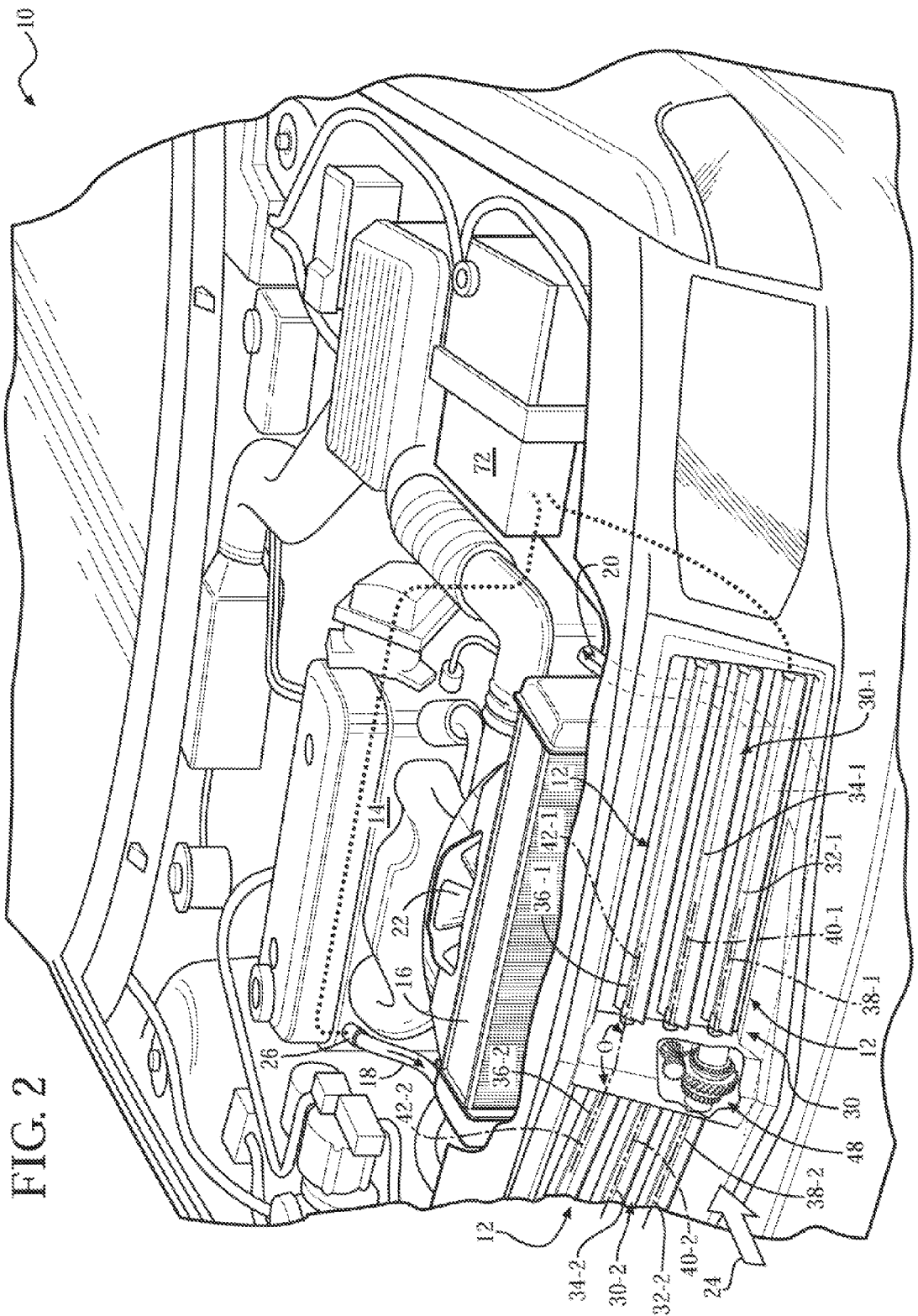
FIG. 2 is a partial perspective view of the vehicle shutter system shown in FIG. 1, with the louvers being depicted in a partially-closed state.
Figure 3:
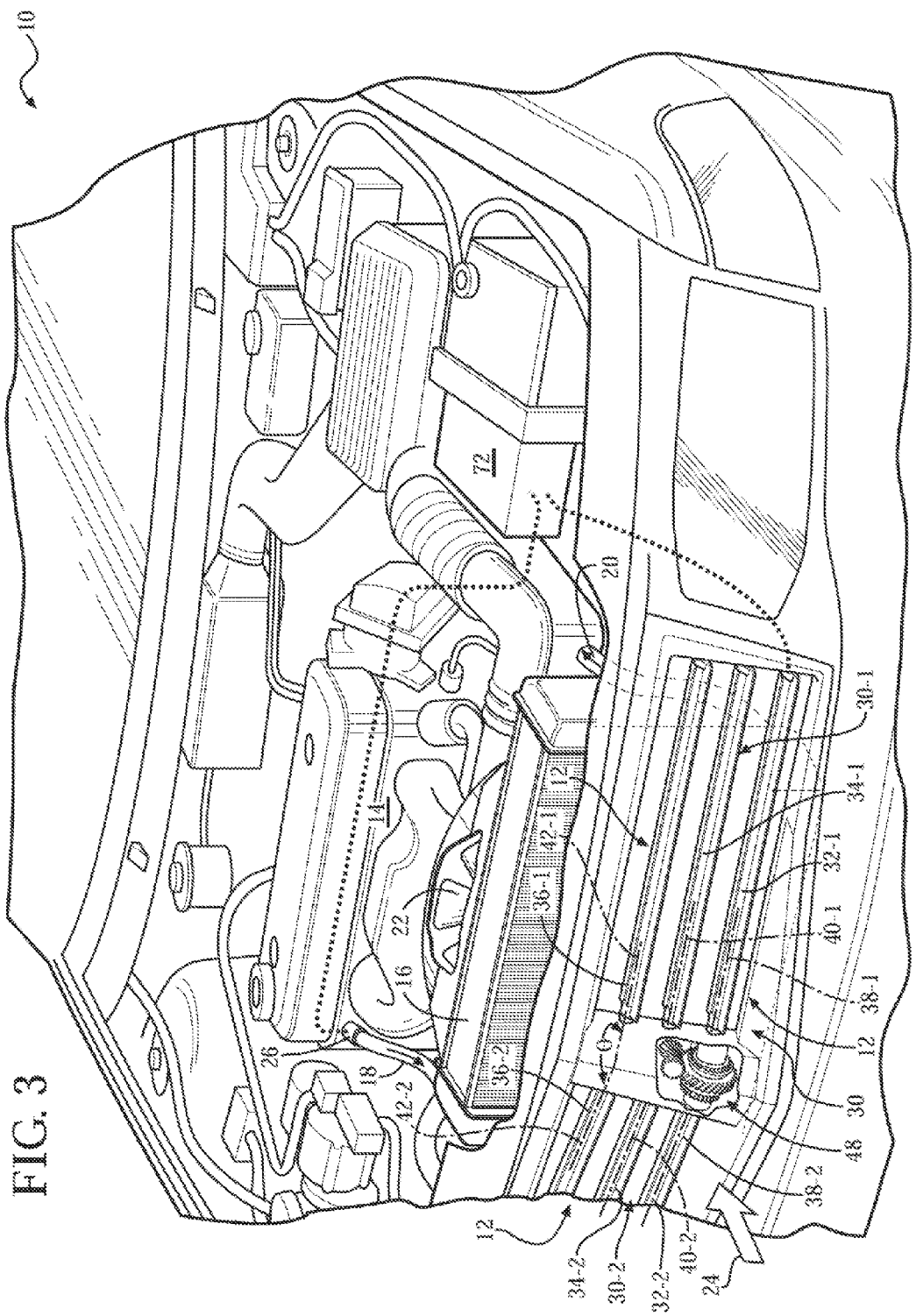
FIG. 3 is a partial perspective view of the vehicle shutter system shown in FIGS. 1 and 2, with the louvers being depicted in a fully-opened state.

Referring to the drawings, wherein like reference numbers refer to like components, FIGS. 1-3 show a partial perspective view of a vehicle 10. The vehicle 10 is shown to include a grille opening 12 typically covered with a mesh. The grille opening 12 is adapted for receiving ambient air. The vehicle 10 additionally includes a powertrain that is specifically represented by an internal combustion engine 14. The powertrain of the vehicle 10 may additionally include a transmission, and, if the vehicle is a hybrid type, one or more motor-generators, none of which is shown, but the existence of which can be appreciated by those skilled in the art. Efficiency of a vehicle powertrain is generally influenced by its design, as well as by the various loads the powertrain sees during its operation.

The vehicle 10 additionally includes an air-to-fluid heat exchanger 16, i.e., a radiator, for circulating a cooling fluid shown by arrows 18 and 20, such as water or a specially formulated coolant, though the engine 14 to remove heat from the engine. A high-temperature coolant entering the heat exchanger 16 is represented by the arrow 18, and a reduced-temperature coolant being returned to the engine is represented by the arrow 20. The heat exchanger 16 is positioned behind the grille opening 12 for protection of the heat exchanger from various road-, and air-borne debris. The heat exchanger 16 may also be positioned in any other location, such as behind a passenger compartment, if, for example, the vehicle has a rear or a mid-engine configuration, as understood by those skilled in the art.

As shown in FIGS. 1-3, a fan 22 is positioned in the vehicle 10, behind the heat exchanger 16, such that the heat exchanger 16 is positioned between the grille opening 12 and the fan. The fan 22 is capable of being selectively turned on and off based on the cooling needs of the engine 14. Depending on the road speed of the vehicle 10, the fan 22 is adapted to either generate or enhance a flow of ambient air or airflow 24 through the grille opening 12, and toward and through the heat exchanger 16. Thus generated or enhanced through the action of the fan 22, the airflow 24 is passed through the heat exchanger 16 to remove heat from the high-temperature coolant 18 before the reduced-temperature coolant 20 is returned to the engine 14. The vehicle 10 additionally includes a coolant sensor 26 configured to sense a temperature of the high-temperature coolant 18 as it exits the engine 14.

FIGS. 1-3 also depict a shutter system 28 having a rotatable or adjustable shutter 30 configured to be selectively placed into various positions. The shutter 30 is secured in the vehicle 10 and is adapted to regulate the amount of airflow 24 entering or flowing into the vehicle from the ambient through the grille opening 12. As shown, the shutter 30 is positioned behind, and immediately adjacent to the grille opening 12 at the front of the vehicle 10. Additionally, the shutter 30 is positioned between the grille opening 12 and the heat exchanger 16. The shutter 30 may also be incorporated into and be integral with the grille opening 12. The shutter 30 includes a first set of louvers 30-1 and a second set of louvers 30-2.

Each set of louvers 30-1 and 30-2 includes a plurality of louvers. The first set of louvers 30-1 includes three individual louver elements 32-1, 34-1, 36-1, while the second set of louvers 30-2 also includes three individual louver elements 32-2, 34-2, 36-2. Although each louver set 30-1 and 30-2 is shown as having three individual louver elements, the number of louvers in each set may either be fewer or greater. As shown in FIGS. 1-6, the first set of louvers 30-1 is disposed at an angle θ that is smaller than 180 degrees relative to the second set of louvers 30-2. Accordingly, each respective louver 32-1, 34-1, and 36-1 is paired with and disposed at angle θ relative to each respective louver 32-2, 34-2, and 36-2. Consistent with the possible configuration of the first and second sets of louvers 30-1, 30-2, the number of louvers disposed and paired in such fashion within shutter system 28 may be fewer or greater, as required for a specific vehicle application.

Figure 4:
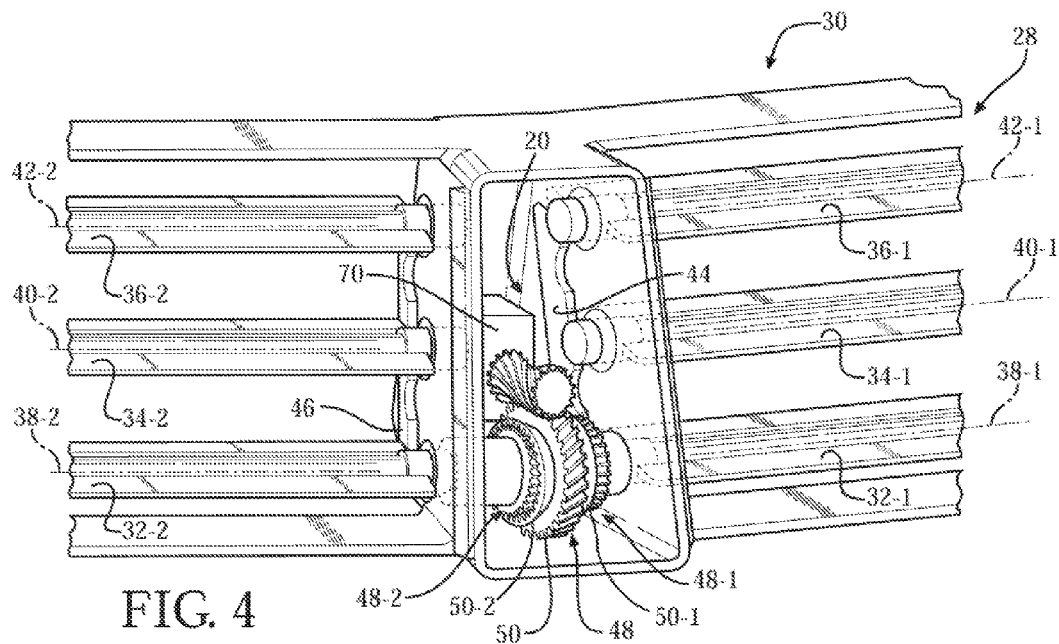
FIG. 4 is a partial perspective enlarged view of the shutter system shown in FIG. 3, depicting an embodiment of a dual-drive actuation mechanism.

Each louver 32-1, 34-1, 36-1, as well as 32-2, 34-2, 36-2, is configured to rotate about a respective pivot axis 38-1, 40-1, 42-1 and 38-2, 40-2, 42-2 during operation of the shutter 30, thereby effectively controlling the size of the grille opening 12 and the amount of ambient air flowing into the vehicle 10. As shown in FIG. 4, each of the first and second sets of louvers 30-1, 30-2 may include respective separate linkages 44 and 46. Linkages 44 and 46 are configured to rotate louvers 32-1, 34-1, 36-1, and 32-2, 34-2, 36-2 about the respective pivot axes 38-1, 40-1, 42-1 and 38-2, 40-2, 42-2. Additionally, in such a situation the rotation of louvers 32-1, 34-1, 36-1 occurs in tandem, i.e., substantially in unison, via the linkage 44. Similarly, the respective rotation of louvers 32-2, 34-2, 36-2 also occurs in tandem via the linkage 46. Accordingly, simultaneous rotation of the first and second sets of louvers 30-1, 30-2 permits the shutter 30 to rotate into any of the available positions.

The shutter 30 is adapted to operate between and inclusive of a fully-closed position or state (as shown in FIG. 1), through an intermediate or partially-closed position (as shown in FIG. 2), and to a fully-opened position (as shown in FIG. 3). When the louver elements 32, 34, and 36 are in any of their open positions, the airflow 24 enters the vehicle 10 by penetrating the plane of the shutter 30 before coming into contact with the heat exchanger 16. The shutter system 28 also includes a dual-drive actuation mechanism 48 configured to rotate the first and second sets of louvers 30-1, 30-2 such that each louver 32-1, 34-1, 36-1, and 32-2, 34-2, 36-2 rotates about the respective pivot axis 38-1, 40-1, 42-1 and 38-2, 40-2, 42-2. The dual-drive mechanism 48 includes a first driven element 48-1 operatively connected to the first sets of louvers 30-1 and a second driven element 48-2 operatively connected to the second set of louvers 30-2. The first driven element 48-1 is shown as being connected to the louver 32-1, while the second driven element 48-2 is shown as being connected to the louver 32-2. However, the first and second driven elements 48-1, 48-2 may likewise be connected to any of the paired louvers of the two sets 30-1 and 30-2.

The dual-drive mechanism 48 additionally includes a drive element 50 configured to receive a drive torque from a drive source and apply the drive torque simultaneously to the first and second driven elements 48-1, 48-2. The rate of rotation of the louver 34-1 and a rate of rotation of the louver 34-2 may be substantially synchronized by the operation of the dual-drive mechanism 48. On the other hand, a geared connection (not shown, but understood by those skilled in the art) may also be incorporated into the dual-drive mechanism 48 having one or more gears between the drive element 50 and at least one of the first and second driven elements 48-1, 48-2. Such a geared connection may be employed to provide the two sets of louvers 30-1, 30-2 with distinct opening rates, which may be beneficial if specific vehicle systems receiving airflow from behind the two sets of louvers have different airflow requirements.

Figure 5:
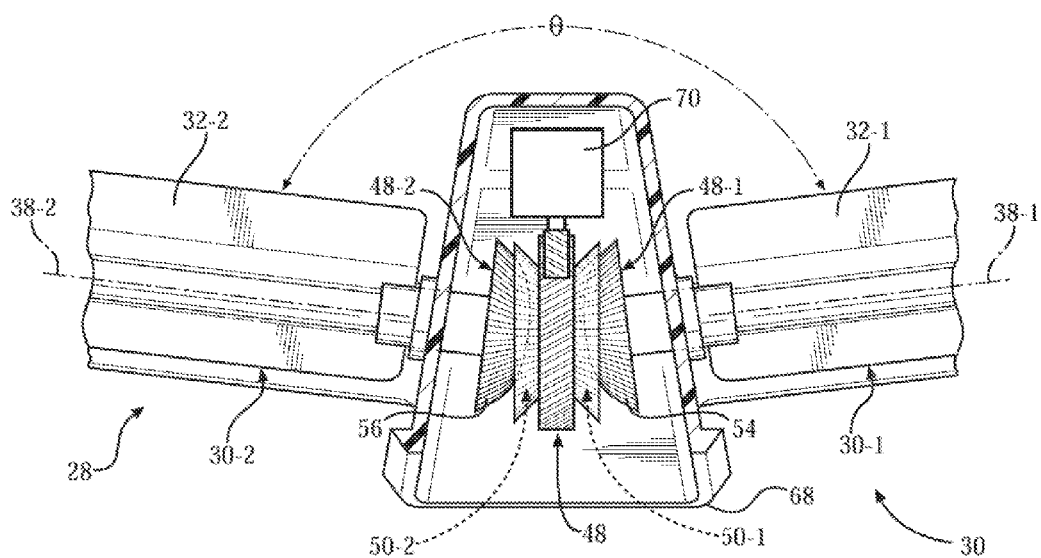
FIG. 5 is a partial cross-sectional enlarged top view of the shutter system and the embodiment of a dual-drive actuation mechanism shown in FIG. 4.

As shown in FIGS. 4 and 5, the first driven element 48-1 may include a first external gear 54 having a spherical profile while the second driven element 48-2 may include a second external gear 56 having a spherical profile. As additionally shown, the drive element 50 may include a first internal toothed portion 50-1 having a conical profile engaged with the first gear 54 and a second internal toothed portion 50-2 having a conical profile engaged with the second gear 56. The spherical profiles of the first and second external gears 54, 56 being engaged with the respective conical profiles of the first and second internal toothed portions 50-1, 50-2 permit the first and second louver sets 30-1, 30-2 to be disposed at the angle θ relative to each other while being simultaneously actuated by the drive element 50. Furthermore, the angle θ is not required to be set in a specific narrow tolerance range, because the spherical profiles of the first and second external gears 54, 56 have the ability to float angularly relative to the respective conically profiled first and second toothed portions 50-1, 50-2 while remaining engaged therewith. Although FIG. 4 shows the first and second spherically profiled external gears 54, 56 on the first ands second driven elements 48-1, 48-2 along with the first and second conically profiled internal toothed portions 50-1, 50-2 on the drive element 50, the reverse configuration where the first and second driven elements 48-1, 48-2 having internal conically profiled gears is engaged with respective first and second spherically profiled external gears on the drive element 50 is also envisioned.

Figure 6:
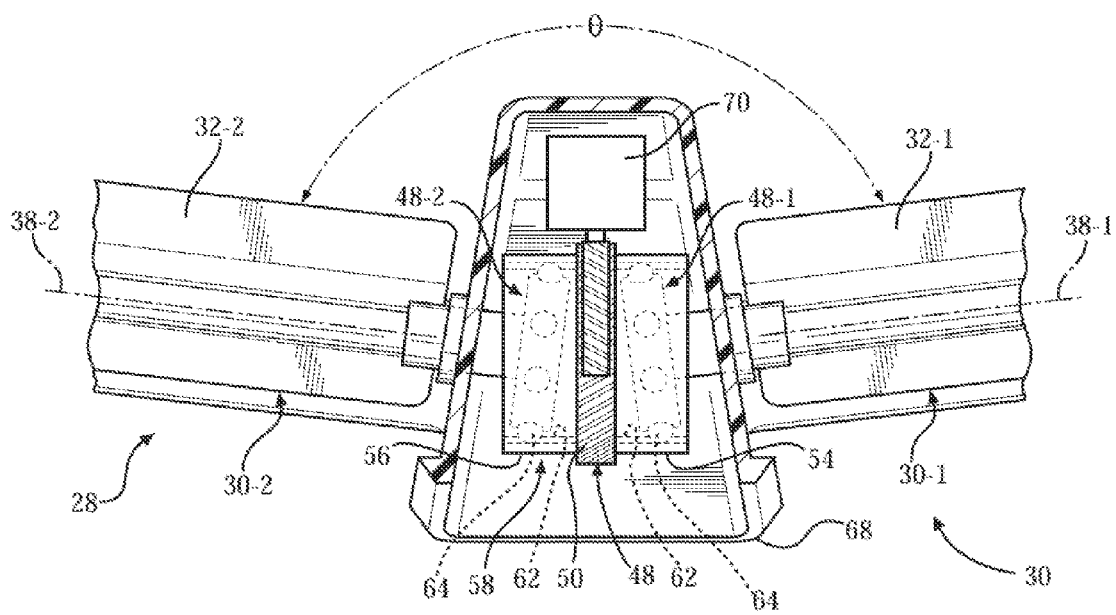
FIG. 6 is a partial cross-sectional enlarged top view of the shutter system shown in FIG. 3, depicting another embodiment of the dual-drive actuation mechanism.
Figure 7:
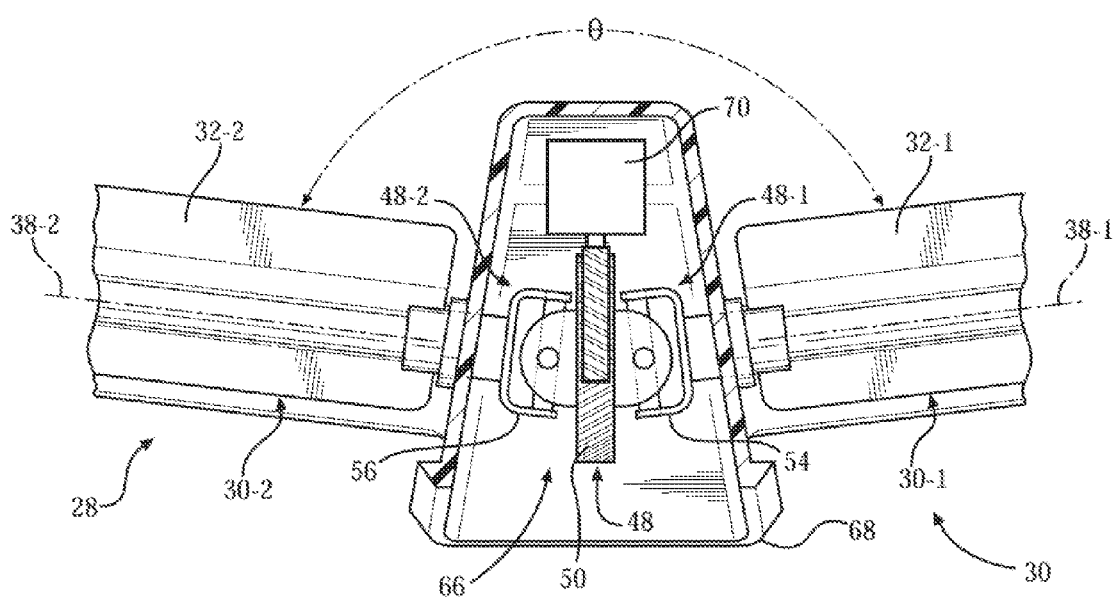
FIG. 7 is a partial cross-sectional enlarged top view of the shutter system shown in FIG. 3, depicting yet another embodiment of the dual-drive actuation mechanism.

On the other hand, as shown in FIG. 6, the drive element 50 may be operatively connected to each of the first driven element 48-1 and the second driven element 48-2 via a constant velocity joint 58. The constant velocity joint 58 of FIG. 6 includes an internal gear 62 on the drive element 50 engaged by multiple appropriately contoured lugs or fins 64 on each of the first and second driven elements 48-1, 48-2. Additionally, as shown in FIG. 7, the drive element 50 may be operatively connected to each of the first driven element 48-1 and the second driven element 48-2 via a universal joint 66. In any of the embodiments of FIGS. 4-7, when drive torque is applied to the drive element 50, the drive element continuously transmits the torque to the first and second driven elements 48-1, 48-2 despite the two sets of louvers 30-1, 30-2 being disposed at the angle θ.

Although in any of the preceding embodiments the drive element 50 is shown as being operatively connected to the first driven element 48-1 and the second driven element 48-2 via external gears 54, 56, constant velocity joints 58, or universal joints 66, the drive element may also transmit the necessary torque via one of such connections or joints to only one of the first and second driven elements. In such a case, the drive element 50 may, for example, be directly connected to only the first driven element 48-1, while the second driven element 48-2 would then be disposed at the angle θ to both the drive element and the first driven element 48-1 (not shown). Accordingly, in the preceding example, the drive element 50 would be disposed substantially square to the first driven element 48-1, while being disposed at the angle θ relative to the second driven element 48-2. Furthermore, the drive element 50 would then apply drive torque to the second driven element 48-2 through either external gear 56, constant velocity joint 58, or universal joint 66.

As shown in FIGS. 5-7, the first driven element 48-1, the second driven element 48-2, and the drive element 50 may be substantially screened from the airflow 24 and protected from airborne dirt and debris via a shield 68. The dual-drive mechanism 48 additionally includes a drive source 70, such as an electric motor shown in FIGS. 4-6, configured to supply the drive torque and rotational motion to the drive element 50.

The shutter system 28 additionally includes a controller 72 configured to regulate the dual-drive mechanism 48 via the drive source 70 and select a desired position for the shutter 30 between and inclusive of fully-opened and fully-closed. Accordingly, the dual-drive mechanism 48 is configured to simultaneously select the desired position for both, the first and second sets of louvers 30-1, 30-2, despite the fact that first louver set and second louver set are disposed at angle θ relative to each other. The controller 72 may be an engine controller or a separate control unit. The controller 72 may also be configured to operate the fan 22, if the fan is electrically driven, and a thermostat (not shown) that is configured to regulate the circulation of coolant, as understood by those skilled in the art.

The controller 72 is programmed to operate the dual-drive mechanism 48 according to the load on the engine 14 and, correspondingly, to the temperature of the coolant sensed by the sensor 26. The temperature of the high-temperature coolant 18 is increased due to the heat produced by the engine 14 under load. As known by those skilled in the art, a load on the engine 14 is typically dependent on operating conditions imposed on the vehicle 10, such as going up a hill and/or pulling a trailer. The load on the engine 14 generally drives up the internal temperature of the engine, which in turn necessitates cooling of the engine for desired performance and reliability. Typically, the coolant is continuously circulated by a fluid pump (not shown) between the engine 14 and the heat exchanger 16.

When the shutter 30 is fully-closed, as depicted in FIG. 1, the two sets of louvers 30-1, 30-2 provide blockage of the airflow 24 at the grille opening 12. A fully-closed shutter 30 provides optimized aerodynamics for the vehicle 10 when engine cooling through the grille opening 12 is not required. The shutter 30 may also be operated by the controller 72 to variably restrict access of the oncoming airflow 24 to the heat exchanger 16, by rotating the two sets of louvers 30-1, 30-2 to an intermediate position, as shown in FIG. 2, where the louvers are partially closed. An appropriate intermediate position of the two sets of louvers 30-1, 30-2 is selected by the controller 72 according to a programmed algorithm to thereby affect the desired cooling of the engine 14. When the shutter 30 is fully-opened, as shown in FIG. 3, each of the two sets of louvers 30-1, 30-2 is rotated to a position parallel to the airflow 24 seeking to penetrate the shutter system plane. Thus, a fully-opened shutter 30 is configured to permit a generally unfettered passage of such a flow of air through the louver plane of the shutter 30.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A shutter system comprising:
   a first louver configured to rotate about a first pivot axis;
   a second louver configured to rotate about a second pivot axis, wherein the second pivot axis intersects the first axis and is arranged at an angle that is smaller than 180 degrees and larger than zero degrees with respect to the first pivot axis; and
   a dual-drive actuation mechanism configured to rotate the first and the second louvers about the respective pivot axes, the mechanism including:
   a first driven element operatively connected to the first louver;
   a second driven element operatively connected to the second louver; and
   a drive element configured to receive a drive torque and apply the drive torque simultaneously to the first and second driven elements, wherein:
   the first driven element includes a first gear,
   the second driven element includes a second gear, and
   the drive element includes a first toothed portion engaged with the first gear and
   a second toothed portion engaged with the second gear, and wherein:
     each of the first and second toothed portions includes one of a spherical and a conical profile and
     each of the first and second gears includes a corresponding one of a conical and a spherical profile.

2. The shutter system of claim 1, wherein a rate of rotation of the first louver and a rate of rotation of the second louver are substantially synchronized by the actuation mechanism.

3. The shutter system of claim 1, wherein the drive element is operatively connected to at least one of the first driven element and the second driven element via one of a constant velocity joint and a universal joint.

4. The shutter system of claim 1, wherein the first driven element, the second driven element, and the drive element are substantially screened from ambient airflow and protected from airborne dirt and debris by a shield.

5. The shutter system of claim 1, wherein the dual-drive actuation mechanism additionally includes an electric motor configured to supply the drive torque to the drive element.

6. The shutter system of claim 1, further comprising a controller configured to regulate the dual-drive actuation mechanism and select a position for the shutter system between and inclusive of fully-opened and fully-closed.

7. The shutter system of claim 6, wherein:
the shutter system is configured to control ambient airflow through a grille opening in a vehicle having an internal combustion engine; and
the controller is configured to regulate the dual-drive actuation mechanism according to a load on the engine.

8. The shutter system of claim 7, wherein the engine is cooled by a fluid circulated through a heat exchanger, and the vehicle includes a sensor configured to sense a temperature of the fluid and configured to communicate the temperature to the controller.

9. The shutter system of claim 8, wherein the controller is configured to regulate the dual-drive actuation mechanism to cool the fluid circulated through the heat exchanger according to the sensed temperature of the fluid.

10. A vehicle comprising:
an internal combustion engine cooled by a circulating fluid;
a heat exchanger configured to cool the fluid via an ambient airflow after the fluid cools the engine;
a grille opening configured for the airflow to pass through on the way to the heat exchanger; and
a shutter system for controlling the airflow through the grille opening, the shutter system including:
a first louver configured to rotate about a first pivot axis;
a second louver configured to rotate about a second pivot axis, wherein the second pivot axis intersects the first axis and is arranged at an angle that is smaller than 180 degrees and larger than zero degrees with respect to the first pivot axis; and
a dual-drive actuation mechanism configured to rotate the first and the second louvers about the respective pivot axes, the dual-drive mechanism including:
a first driven element operatively connected to the first louver;
a second driven element operatively connected to the second louver; and
a drive element configured to receive a drive torque and apply the drive torque simultaneously to the first and second driven elements, wherein:
the first driven element includes a first gear,
the second driven element includes a second gear, and
the drive element includes a first toothed portion engaged with the first gear and a second toothed portion engaged with the second gear, and wherein
each of the first and second toothed portions includes one of a spherical and a conical profile and
each of the first and second gears includes a corresponding one of a conical and a spherical profile.

11. The vehicle of claim 10, wherein a rate of rotation of the first louver and a rate of rotation of the second louver are substantially synchronized by the actuation mechanism.

12. The vehicle of claim 10, wherein the drive element is operatively connected to at least one of the first driven element and the second driven element via one of a constant velocity joint and a universal joint.

13. The vehicle of claim 10, wherein the first driven element, the second driven element, and the drive element are substantially screened from ambient airflow and protected from airborne dirt and debris by a shield.

14. The vehicle of claim 10, wherein the dual-drive actuation mechanism additionally includes an electric motor configured to supply the drive torque to the drive element.

15. The vehicle of claim 10, further comprising a controller configured to regulate the dual-drive actuation mechanism and select a position for the shutter system between and inclusive of fully-opened and fully-closed.

16. The vehicle of claim 15, wherein the controller is configured to regulate the dual-drive actuation mechanism according to a load on the engine.

17. The vehicle of claim 16, further comprising a sensor configured to sense a temperature of the fluid and configured to communicate the temperature to the controller.

18. The vehicle of claim 17, wherein the controller is configured to regulate the dual-drive mechanism to cool the fluid circulated through the heat exchanger according to the sensed temperature of the fluid.

* * * * *